US008238832B1

(12) United States Patent
Zhou

(10) Patent No.: US 8,238,832 B1
(45) Date of Patent: Aug. 7, 2012

(54) ANTENNA OPTIMUM BEAM FORMING FOR MULTIPLE PROTOCOL COEXISTENCE ON A WIRELESS DEVICE

(75) Inventor: Cuifeng Zhou, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 661 days.

(21) Appl. No.: 12/199,639

(22) Filed: Aug. 27, 2008

Related U.S. Application Data

(60) Provisional application No. 60/968,467, filed on Aug. 28, 2007.

(51) Int. Cl.
*H04B 1/00* (2006.01)
*H04B 15/00* (2006.01)

(52) U.S. Cl. .............. 455/63.4; 455/41.2; 455/552.1

(58) Field of Classification Search ............ 455/11.1, 455/25, 41.1, 41.2, 41.3, 517, 63.1, 63.4, 455/65, 66.1, 67.11, 67.13, 552.1, 562.1, 455/569.2, 575.7, 575.9
See application file for complete search history.

(56) References Cited

U.S. PATENT DOCUMENTS

| 6,353,406 | B1 * | 3/2002 | Lanzl et al. ........... 342/118 |
| 6,549,762 | B1 | 4/2003 | Hirabe |
| 6,950,480 | B2 | 9/2005 | Brown |
| 2002/0086708 | A1 | 7/2002 | Teo et al. |
| 2002/0123371 | A1 * | 9/2002 | Miyoshi et al. .......... 455/562 |
| 2002/0136233 | A1 | 9/2002 | Chen et al. |
| 2003/0195010 | A1 | 10/2003 | Pattabiraman et al. |
| 2004/0113839 | A1 * | 6/2004 | Vaccaro et al. .......... 342/377 |
| 2006/0194538 | A1 * | 8/2006 | Palin et al. ............ 455/41.2 |
| 2008/0233875 | A1 * | 9/2008 | Desai et al. ........... 455/41.2 |

FOREIGN PATENT DOCUMENTS

| WO | WO 2004/114534 | 12/2004 |
| WO | WO 2005/107100 | 11/2005 |

OTHER PUBLICATIONS

AOZ, Specification of the Bluetooth System, Wireless connections made easy, Master Table of Contents & Compliance Requirements, Covered Core Package version: 2.0+ EDR Current Master TOC issues: Nov. 4, 2004.
Barr, J.R.:"Bluetooth Wireless Technology Overview," Sep. 19, 2007, 1-20, found online at https://mentor.eee.org/802.11/public-file/07/11-07-2361-00-0000-bluetooth-r-wireless-technology-overview.ppt.
Barr, J.R., "Bluetooth SIG Overview," May 16, 2007, 1-14 found online at https://mentor.eee.org/802.11/file/07/11-07-0747-00-0000-bluetooth-sig-overview.ppt.
Breslin, "Adaptive Antenna Arrays Applied to Position Location," Thesis (1997).
Cheney, "The Linear Sampling Method and the MUSIC Algorithm" (2003).
How 802.11b/g WLAN and Bluetooth Can Play, Without standards-bsed solutions, ICs must referee spectrum rivalry (2005).

(Continued)

*Primary Examiner* — Ping Hsieh

(57) ABSTRACT

In a method for forming beam patterns for a wireless device, the device determines angles of arrival for data signals corresponding to different wireless network protocols, such as Bluetooth signals and wireless local area network signals. The wireless device has multiple antenna array and a beamform controller to selectively transmit and receive data signals along a communication path corresponding to the angle of arrival of the particular protocol data. Data signal transmissions along angles of arrival corresponding to other protocol channels are suppressed to avoid interference between data signals and to allow the wireless device to receive data signals for different protocols simultaneously.

41 Claims, 13 Drawing Sheets

OTHER PUBLICATIONS

IEEE Std 802.11g/D2.8, May 2002 (Supplement to ANSI/IEEE Std 802.11, 1999 Edition), Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed PHysical Layer Extension in the 2.4 GHz Band.

IEEE P802.11g/D8.2, Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band (Supplement to ANSI/IEEE Std 802.11 1999 (Reaff 2003)).

International Standard, ISO/IEC 8802-11, ANSI/IEEE Std 802.11, Information technology—Telecommunications and information exchange between systems—Local and metropolitan area networks—Specific requirements—Part 11: Wireless LAN Medium Access Control (MAC) and Physical Layer (PHY) specifications.

IEEE Std for Local and metropolitan area networks, 802.16, Part 16: Air Interface for Fixed Broadband Wireless Access Systems, IEEE Computer Society and the IEEE Microwave Theory and Techniques Society (2004).

IEEE P802.11n/D3.00, Draft Standard for Information Technology—Telecommunications and information exchange between systems—Local and metropolitan area networks—Specific Requirements—Part 11: Wireless LAN Medium Access Control (MAC) and Physical Layer (PHY) specifications: Amendment 4: Enhancements for Higher Throughput (2007).

IEEE 802.11h, Standard for Information Technology—Telecommunications and information exchange between systems—Local and metropolitan area networks—Specific requirements, Part 11: Wireless LAN Medium Access Control (MAC) and Physical Layer (PHY) specifications; Amendment 5: Spectrum and Transmit Power Management Extensions in the 5 GHz band in Europe (2003).

IEEE Std 802.11b-1999/Cor 1-2001, Standard for Information Technology—Telecommunications and information exchange between systems—Local and metropolitan area networks—Specific Requirements—Part 11: Wireless LAN Medium Access Control (MAC) and Physical Layer (PHY) specifications; Amendment 2: Higher-speed Physical Layer (PHY) extension in the 2.4 GHz band—Corrigendum 1 (2001).

International Search Report from PCT/US2008/071623 dated Dec. 15, 2008.

International Search Report from PCT/US2008/074209 dated Mar. 25, 2009.

Lansford et al., "Wi-If (802.11b) and Bluetooth: Enabling Coexistence," IEEE Netowrk, Sep./Oct. 2001, 20-27.

Spectral Estimation Using a MUSIC Algorithm, Nios II Embedded Processor Design Contest—Outstanding Designs 2005.

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band, IEEE Std 802.11b-1999.

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band, IEEE Std 802.11a-1999.

TGn Sync Proposal Technical Specification , IEEE P802.11 Wireless LANs (2005).

Written Opinion from PCT/US2008/071623 dated Dec. 15, 2008.
Written Opinion from PCT/US2008/074209 dated Mar. 25, 2009.

* cited by examiner

ANTENNA OPTIMUM BEAM FORMING FOR MULTIPLE PROTOCOL COEXISTENCE ON A WIRELESS DEVICE

CROSS-REFERENCE TO RELATED APPLICATION

The present application claims the benefit of U.S. Provisional Application No. 60/968,467, entitled "Dual Antenna Optimum Beam Forming for WLAN BT Coexistence on Handset Device," filed on Aug. 28, 2007, which is hereby incorporated by reference herein in its entirety.

FIELD OF TECHNOLOGY

The present disclosure relates generally to communication devices, and more particularly, to techniques for controlling beam patterns from dual antenna communication devices.

DESCRIPTION OF THE RELATED ART

Wireless communication devices enjoy relatively widespread use. Cellular phones are becoming commonplace. Many users connect their laptop computers to wireless local area networks (WLAN) at home and on the road. Motorists use wireless earpiece headsets for hands free calling operation while driving. Indeed, many automobile manufacturers provide hands-free operation integrated directly with the vehicle.

These devices traditionally would operate under one of a number of different networking protocols. WLAN devices for example typically operate under one of the various Institute of Electrical and Electronics Engineers (IEEE) 802.11 standard wireless protocols, first promulgated in 1999. These protocols include IEEE 802.11a, 802.11b, 802.11n, and 802.11g and operate at different spectrum bands and/or different multiplexing or spread spectrum schemes. The protocol coined WiFi allows one to establish a WLAN. Commonly, WLAN devices are used in an infrastructure network topology, in which communications are routed through a host, base station, or other access point. Another wireless protocol is the Bluetooth protocol, which is commonly used in an ad-hoc network topology configuration for peer-to-peer communication between devices, such as between a cellular handset phone and a wireless earpiece headset. Either network configuration may support any number of devices including laptop computers, handheld computers, printers, storage media, and other network equipment, such as hosts, routers, switches, etc. In some examples, such as with Bluetooth protocols, the wireless devices may be handheld communicators like cellular telephones or walkie-talkies.

More recently, communication devices have been designed to support multiple network protocols (e.g., Bluetooth and WLAN) in the same device. For example, a cellular phone may be able to send and receive voice data with a headset over a Bluetooth channel and separately send and receive voice, video, image, text, and other data over an 802.11 channel.

To achieve dual operation, for example, the common practice is to use a three wire collaboration scheme, essentially a media access control (MAC) layer antenna time sharing, such that Bluetooth and WLAN transceivers within a device can be made aware of each other's activities. This scheme works fairly well when both protocol transceivers are transmitting, but performs quite poorly in the receive mode. There is often strong collocation interference when Bluetooth and WLAN data are simultaneously sent to a dual operation device. For example, such interference will render communication to a Bluetooth headset essentially ineffective when data is simultaneously being transmitted to a wireless device by the WLAN access point.

It would be desirable to develop techniques for isolating between WLAN and Bluetooth communication paths to effectively minimize interference and allow dual capability devices to achieve actual simultaneous dual transmit/receive operation.

SUMMARY OF THE DISCLOSURE

In one embodiment, a method for forming beam patterns for a primary network device having an antenna array, the method comprises: identifying a first communication path between the primary network device and a first remote wireless device, where the first communication path is for transmitting Bluetooth data; identifying a second communication path between the primary network device and a second remote wireless device, where the second communication path is for transmitting wireless local area network (WLAN) data; determining a first beam pattern for the antenna array for communicating the Bluetooth data along the first communication path while minimizing interference attributed to the Bluetooth data along the second communication path; and determining a second beam pattern for the antenna array for communicating WLAN data along the second communication path while minimizing interference attributed to the WLAN data along the first communication path.

In another embodiment, an apparatus for controlling beamforming of an antenna array for a network device comprises: a Bluetooth interface to receive Bluetooth data; a wireless local area network (WLAN) interface to receive WLAN data; and a beamform controller to control the antenna array to transmit and receive the Bluetooth data along a first communication path occurring at a first beam pattern angle of arrival and to control the antenna array to transmit and receive the WLAN data along a second communication path occurring at a second beam pattern angle of arrival different than the first beam pattern angle of arrival.

In yet another embodiment, a method for forming beam patterns for a wireless device having an antenna array comprises: determining a first communication path between the wireless device and a first remote device, the first communication path having a first beam pattern that is used for communicating first data that is compliant with a first wireless communication protocol; and determining a second communication path between the wireless device and a second remote device, the second communication path having a second beam pattern that is used for communicating second data that is compliant with a second wireless communication protocol; wherein the first beam pattern is to minimize interference attributed to the first data along the second communication path and the second beam pattern is to minimize interference attributed to the second data along the first communication path.

In another embodiment, an apparatus for forming beam patterns for a wireless device having an antenna array comprises: a first protocol interface to receive first data that is compliant with a first wireless communication protocol; a second protocol interface to receive second data that is compliant with a second wireless communication protocol; and a beamform controller to determine a first communication path between the wireless device and a first remote device, the first communication path having a first beam pattern that is used for communicating the first data, and the beamform controller to determine a second communication path between the wireless device and a second remote device, the second communication path having a second beam pattern that is used for communicating the second data; wherein the first beam pattern is to minimize interference attributed to the first data along the second communication path and the second beam pattern is to minimize interference attributed to the second data along the first communication path.

In an embodiment, an apparatus for controlling beamforming of an antenna array for a network device comprises: a first interfacing means to receive Bluetooth data; a second interfacing means to receive wireless local area network (WLAN) data; and third means to control the antenna array to transmit and receive the Bluetooth data along a first communication path occurring at a first beam pattern angle of arrival and to control the antenna array to transmit and receive the WLAN data along a second communication path occurring at a second beam pattern angle of arrival different than the first beam pattern angle of arrival.

In another embodiment, an apparatus for controlling beamforming of an antenna array for a network device comprises a processor and a computer-readable medium having computer-executable instructions that, when executed, cause the processor to: receive Bluetooth data; receive wireless local area network (WLAN) data; and control the antenna array to transmit and receive the Bluetooth data along a first communication path occurring at a first beam pattern angle of arrival and control the antenna array to transmit and receive the WLAN data along a second communication path occurring at a second beam pattern angle of arrival different than the first beam pattern angle of arrival.

In an embodiment, an apparatus for forming beam patterns for a wireless device having an antenna array comprises: a first interfacing means to receive first data that is compliant with a first wireless communication protocol; a second interfacing means to receive second data that is compliant with a second wireless communication protocol; and a third means to determine a first communication path between the wireless device and a first remote device, the first communication path having a first beam pattern that is used for communicating the first data, and the third means to determine a second communication path between the wireless device and a second remote device, the second communication path having a second beam pattern that is used for communicating the second data; wherein the first beam pattern is to minimize interference attributed to the first data along the second communication path and the second beam pattern is to minimize interference attributed to the second data along the first communication path.

In yet another embodiment, an apparatus for forming beam patterns for a wireless device having an antenna array comprises a processor and a computer-readable medium having computer-executable instructions that, when executed, cause the processor to: receive first data that is compliant with a first wireless communication protocol; receive second data that is compliant with a second wireless communication protocol; and determine a first communication path between the wireless device and a first remote device, the first communication path having a first beam pattern that is used for communicating the first data, and determine a second communication path between the wireless device and a second remote device, the second communication path having a second beam pattern that is used for communicating the second data; wherein the first beam pattern is to minimize interference attributed to the first data along the second communication path and the second beam pattern is to minimize interference attributed to the second data along the first communication path.

DETAILED DESCRIPTION

Figure 1:
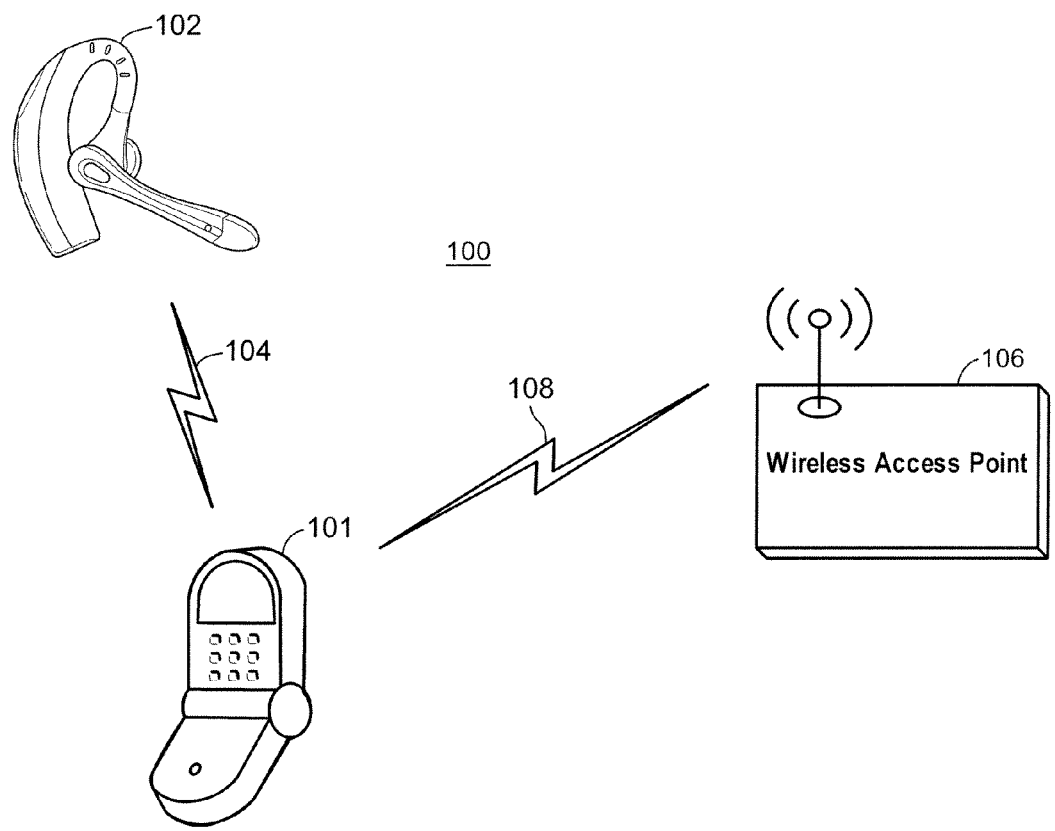
FIG. 1 is a diagram illustrating a dual network device having a Bluetooth communication path with a headset and a WLAN communication path with a network access point.

FIG. 1 depicts an example communication system 100 in which a primary network device 101 is capable of communicating over a wireless network or networks using multiple communication protocol paths, e.g., using both Bluetooth and WLAN protocols. The network device 101 may be a portable digital assistant (PDA), cellular phone, vehicle, media player, laptop computer, wireless supported desktop computer, gaming system, networking device such as a router, switch, etc., or any other portable computing device. The network device 101 may communicate with any number of devices through various communication paths. In the illustrated example, the device 101 communicates with a remote Bluetooth device 102 through a Bluetooth communication path 104, and with a remote WLAN device 106 (e.g., a wireless access point) through a separate WLAN communication path 108. The device 101 is thus an example of a dual network device. The Bluetooth communication path 104 may be a standard Synchronous Connection Orientated (SCO) link for communicating voice data, for example, when the device 102 is a headset. In other examples, the Bluetooth communication path 104 may be an Asynchronous Connection Link (ACL), e.g., an asynchronous (packet-switched) connection for sending multimedia data between two communication devices.

The device 101 is shown in a common position for a user, in the user's hand or pocket or attached to their waist. In this position, the communication paths 104 and 108 extend in different directions because the corresponding devices 102, 106 are typically in distinctly different locations. The Bluetooth headset device 102 is typically positioned in a user's ear and above the device 101, while the WLAN access point 106 is typically positioned at some horizontal distance away from the user. As such, signals from the Bluetooth device 102 generally arrive at the device 101 along one angle of arrival, while signals from the WLAN device 106 generally arrive at a different angle of arrival.

Figure 2:
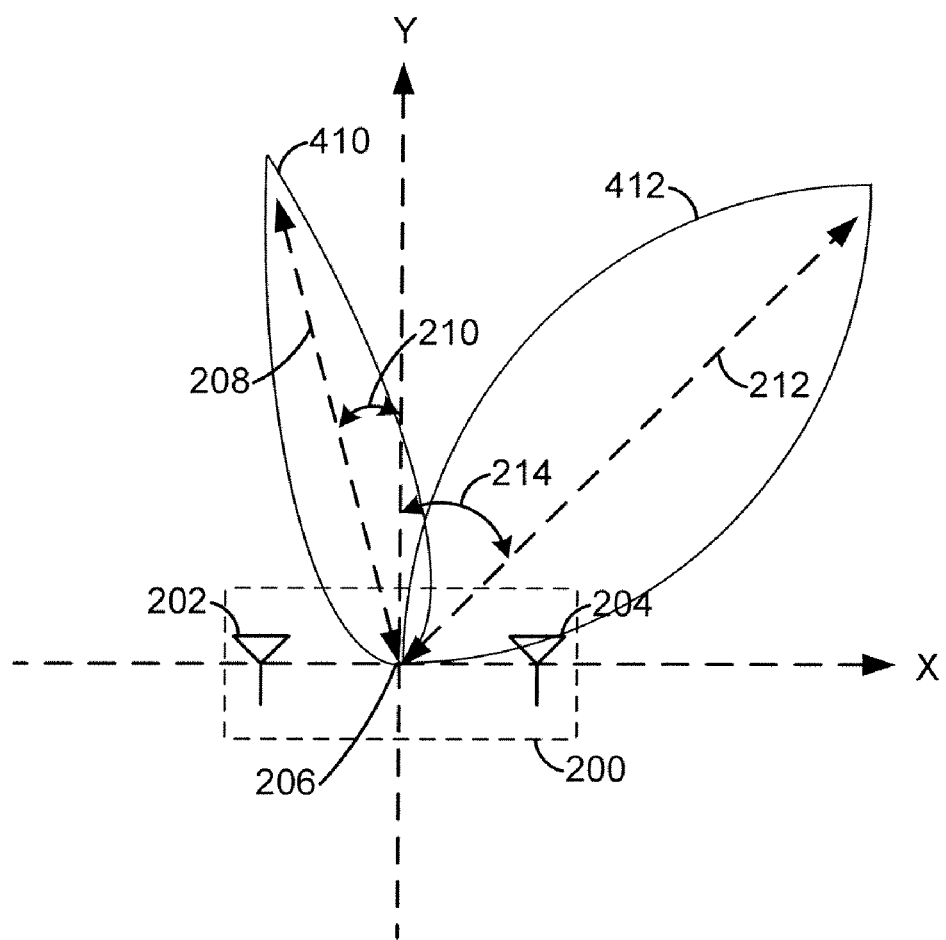
FIG. 2 is an illustration of the angle of arrival for Bluetooth data and WLAN data for the dual network device of FIG. 1.

FIG. 2 depicts a dual antenna array 200 for the device 101 and having a Bluetooth channel antenna 202 and a WLAN channel antenna 204, which collectively define a node or null position 206. Assuming signals are traveling as plane waves, a first path 208 coincides with the most direct path for communicating Bluetooth data (e.g., path 104) between the devices 101 and 102 (not show). The path 208 occurs at an angle of arrival 210 to a normal of the node 206, as defined by the y-axis. In the illustrated example, that angle of arrival 210 is approximately −10°. A second path 212 coinciding with most direct path for communicating WLAN data (e.g., path 108) between the devices 101 and 106 (not shown) occurs at an angle of arrival 214 to the node 206, and with an angle of arrival 214 of approximately 45°.

Figure 3:
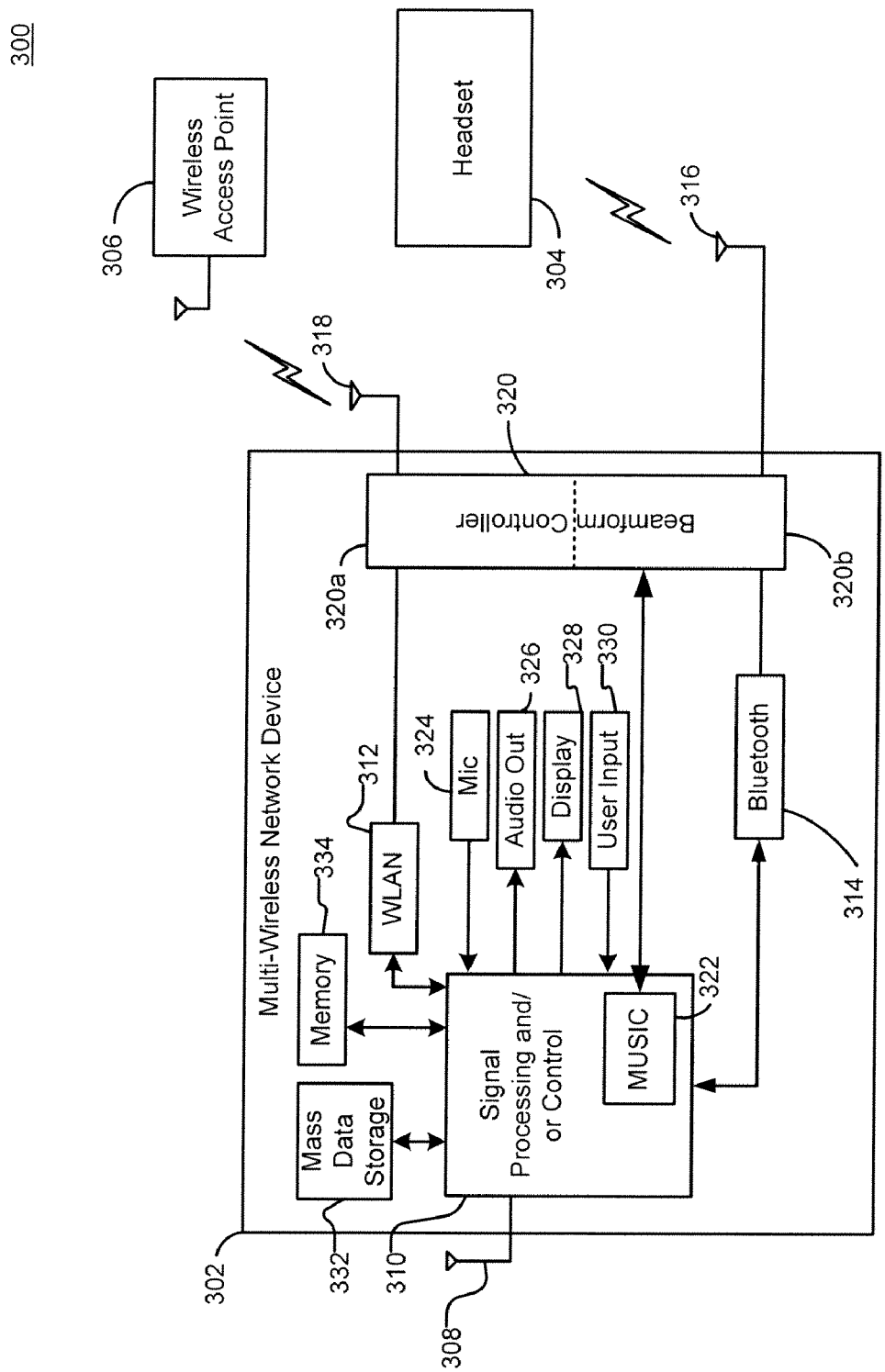
FIG. 3 is a block diagram of a front end for the dual network device of FIG. 1 and showing a beamform controller and circuitry for estimating angles of arrival.

FIG. 3 is a block diagram illustrating an example system 300 including a multi-wireless network device 302 (hereinafter termed a wireless device) capable of controlling beamforming from an antenna array to (simultaneously or otherwise) communicate with a Bluetooth compatible headset 304 and a wireless access point 306. The network device 302 may be any of the devices described with respect to device 101, for example. In the illustrated example, the wireless device 302 includes a cellular antenna 308 and a signal processing and/or control circuit 310. The device 302 further includes a WLAN network interface 312 acting as WLAN transceiver for communicating with the wireless access point 306, and a Bluetooth interface 314 acting as a Bluetooth transceiver for communicating with the headset 304. The WLAN network interface 312 may include, or be coupled to, a WLAN control block (not shown). The Bluetooth interface 314 may include, or be coupled to, a Bluetooth control block (not shown). The WLAN control block and the Bluetooth control block may be coupled together. Optionally, the WLAN control block and/or the Bluetooth control block may be included in the signal processing and/or control block 310.

The wireless device 302 is able to form substantially non-interfering beam patterns to transmit data from different network protocol types in different directions. The device 302 includes a Bluetooth antenna 316 and a WLAN antenna 318 that collectively form a dual antenna array, and a beamform controller 320 coupled to both to control beam patterns from that array. The controller 320 includes two stages, 320a and 320b, each dedicated to one of the network protocol-specific interfaces 312 and 314, respectively, and each controlled by the signal processing and/or control circuit 310. For example, the signal processing and/or control circuit 310 includes a dedicated processing block that executes a multiple signal classification (MUSIC) algorithm that determines the angle of arrival of the different signals from the wireless access point 306 and the Bluetooth headset 304 to identify respective communication paths to/from each.

In some implementations, the device 302 includes a microphone 324, an audio output 326 such as a speaker and/or audio output jack, a display 328 and/or an input device 330 such as a keypad, pointing device, voice actuation and/or other input device. As the remote devices 304 and 306 communicate with the device 302, the signal processing and/or control circuit 310 may process data, perform coding and/or encryption, perform calculations, format data and/or perform other mobile phone functions.

The device 302 may include a mass data storage 332 that stores data in a nonvolatile manner such as optical and/or magnetic storage devices, for example, hard disk drives HDD and/or DVDs. The device 302 may include a memory 334 such as RAM, ROM, low latency nonvolatile memory such as flash memory and/or other suitable electronic data storage. The device 302 also may support connections with a separate network via the WLAN interface 312. In some examples, the device 302 may utilize a power management (or other) mode to stop the access point 306 from sending WLAN data packets to the device 302 when Bluetooth data is expected, thus preventing the device simultaneously receiving both WLAN data and Bluetooth data. However, with the beamform controller 320 being able to selectively control Bluetooth data and WLAN data along different communication paths, and suppressed along non-desired communication paths, the device 302 may transmit and receive Bluetooth data and WLAN data simultaneously without substantial interference between the data types.

Figure 4:
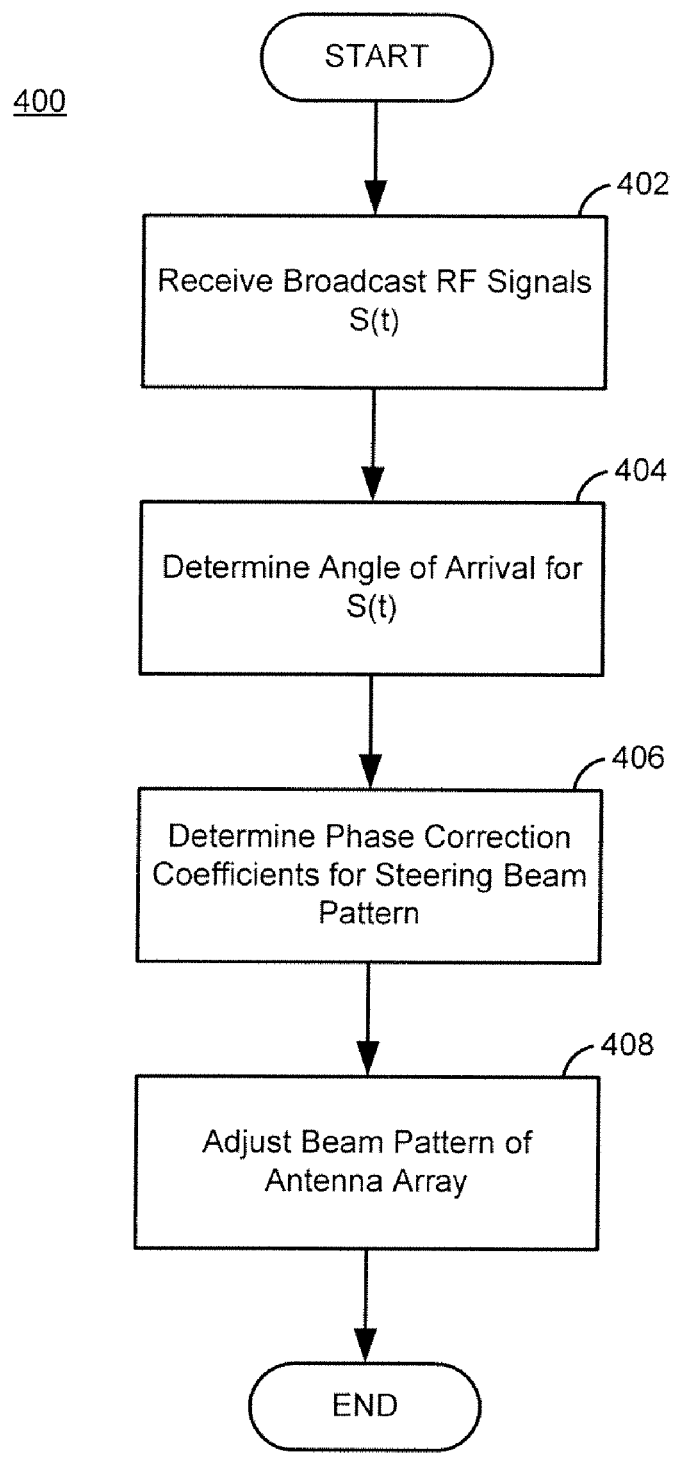
FIG. 4 is a flow diagram of an example technique for preventing interference between a Bluetooth communication path and a WLAN communication path.

FIG. 4 shows an example flow diagram 400 for beamforming the beam pattern from a multiple antenna array to reduce interference between Bluetooth and WLAN data signals. For example, the diagram 400 may represent processes that may be achieved by the beamform controller 320 and the MUSIC block 322 of the signal processing and/or control circuit 302 to optimize the beamform patterns from the antenna array and more accurately direct data signals of different network protocols (e.g., Bluetooth and WLAN) and corresponding to different remote devices (e.g., 304 and 306).

Initially, block 402 receives a broadcast time varying radio frequency (RF) signal, S(t), that may be from the WLAN device 306 or the Bluetooth device 304 or that may be a combined signal from both remotes sources. In an initial set-up mode, both antennas 316 and 318 would have beam patterns (e.g., omni-directional beam patterns) to receive signals from both remote devices 304, 306. The signal S(t) may be converted to a baseband frequency and separated into in-phase, I(t), and quadrature-phase, Q(t), components, and then sent to block 404 that determines the angle of arrival of the signal S(t) or if multiple sources have been used, the angles of arrival of each source collectively forming signal S(t). For example, the block 404 may execute a MUSIC algorithm that provides high resolution spectral estimation of source position using an eigen decomposition on a covariance matrix of data vectors obtained from sampling the signal S(t).

Once the angle (or angles) of arrival of signal S(t) is (are) determined, block 406 may determine the phase correction coefficients needed for steering the beam pattern of the primary device 302 to the particular remote device 304, 306 to thereby reduce interference between the Bluetooth communication path and the WLAN communication path. This may be achieved by the signal processing and/or control circuit 310. Block 408 applies phase correction coefficients from block 406 to the antenna array (e.g., 316 and 318) of the device 302 to control beamforming of the antenna array gain pattern. Each antenna in the array will have a different phase correction coefficient. And the phase correction coefficients for the entire array will be optimized for each of the different protocol type identified by the process above. For example, block 408 determines a first set of phase adjustments needed for the antennas (e.g., 316 and 318) in the array to create a first beam pattern for transmitting and receiving Bluetooth data along one angle of arrival direction and a second set of phase adjustments needed to create a second beam pattern for transmitting and receiving WLAN data along a different angle of arrival direction.

Applying the process 400 to the example of FIG. 2, the process 400 controls the phase of antennas 202 and 204 simultaneously to form a first beam pattern 410 for communicating Bluetooth data and a second beam pattern 412 for communicating WLAN data, each along the directions 208 and 212, respectively.

Figure 5:
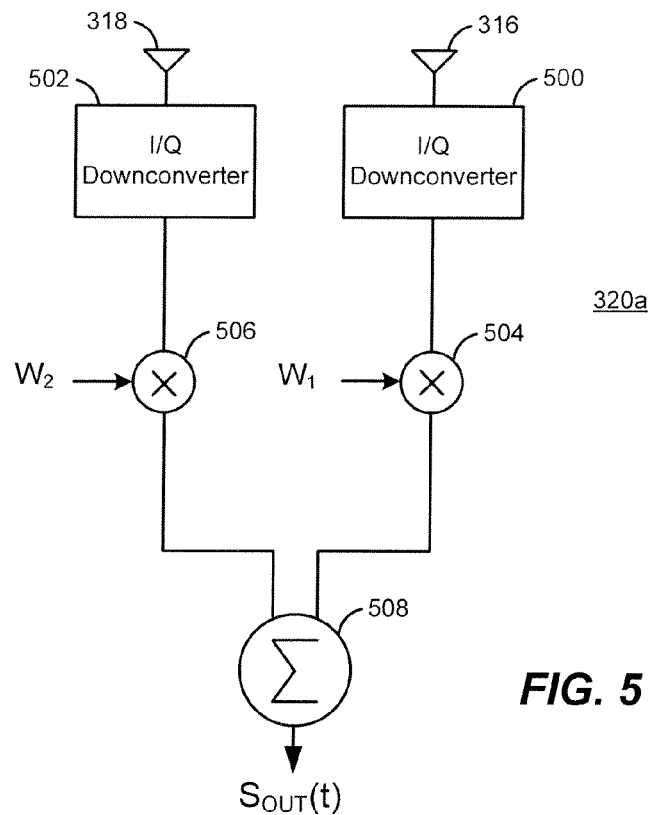
FIG. 5 is a block diagram of an example digital receiver portion of a dual network device.

FIG. 5 is a block diagram of the first stage 320a of the beamform controller 320 that is used for communication through the WLAN interface 312. In other examples, the illustration may reflect the second stage 320b for the Bluetooth interface 314, as the two stages may be identical. The antennas 316 and 318 receive an RF signal, S(t), although each may receive the signal at a different strength or along a different direct or reflected path. Signal S(t) is passed to downconverter circuits 500 and 502, respectively, which each produce a corresponding in-phase, I(t), and quadrature-phase, Q(t), signal at a baseband frequency. The first downconverter circuit 500 is coupled to a first multiplier 504 receiving a first complex weighting coefficient, $W_1$, and the second downconverter circuit 502 is coupled to a second multiplier 506 receiving a second complex weighting coefficient, $W_2$. Initially, during a set-up mode, when the device 302 is determining the angles of arrival, the values of $W_1$ and $W_2$ may be unity.

The weighting coefficients, $W_1$ and $W_2$, may be determined by the signal processing and/or control circuit 310 based on angle of arrival data from the MUSIC algorithm block 322 or based on another algorithm also capable of identifying communications paths from different remote devices. A different pair of weighting coefficient values, $W_1$ and $W_2$, may be used by the beamform controller stages (e.g., 320a and 320b) for each different, identified communication path or protocol type. The weighted signals from the stages 500 and 502 are combined in a summing circuit 508 to produce a signal $S_{OUT}(t)$, which is provided to the WLAN interface 312 for demodulation and analog-to-digital conversion, but also to the signal processing and/or control block 310 for determining the angle(s) of arrival.

Figure 6:
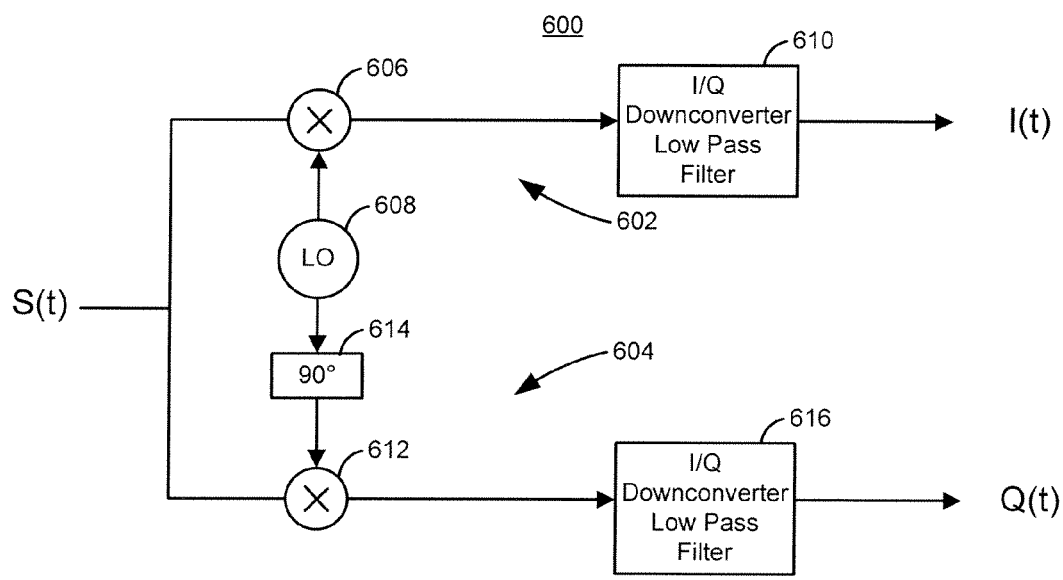
FIG. 6 is a block diagram of the beamform controller of FIG. 3.

FIG. 6 illustrates an example I/Q downconverter circuit 600 that may be implemented as either circuit 500 or 502. The incoming signal S(t) from the respective antenna (not shown) is coupled to an in-phase signal path 602 and a quadrature-phase signal path 604. The signal S(t) is downmixed at mixer 606, with an oscillating signal from a local oscillator 608, and passed through a low pass filter (LPF) 610 to produce the corresponding I(t) signal for that particular antenna's received signal S(t). In the quadrature signal path 604, the signal S(t) is downmixed at a mixer 612 that receives the oscillating signal from the local oscillator 608 but phase shifted 90° by a phase shifting stage 614, before being passed through another LPF 616 to produce the corresponding Q(t) signal. The I(t) and Q(t) signals may be sent to the MUSIC algorithm block 322 after remixing via summer 508, which may determine not only the angle(s) of arrival of the signal(s) forming signal S(t), but may also determine an optimal difference angle between an identified signal S(t) and any previously identified signals S(t). For example, if the current signal S(t) is from a Bluetooth remote source, then the MUSIC algorithm block 322 may not only identify the angle of arrival from that source but also determine the difference from the angle of arrival previously determined for Bluetooth data transmitted via a different remote device. The same determination would apply to WLAN data and WLAN communication paths.

Figure 7:
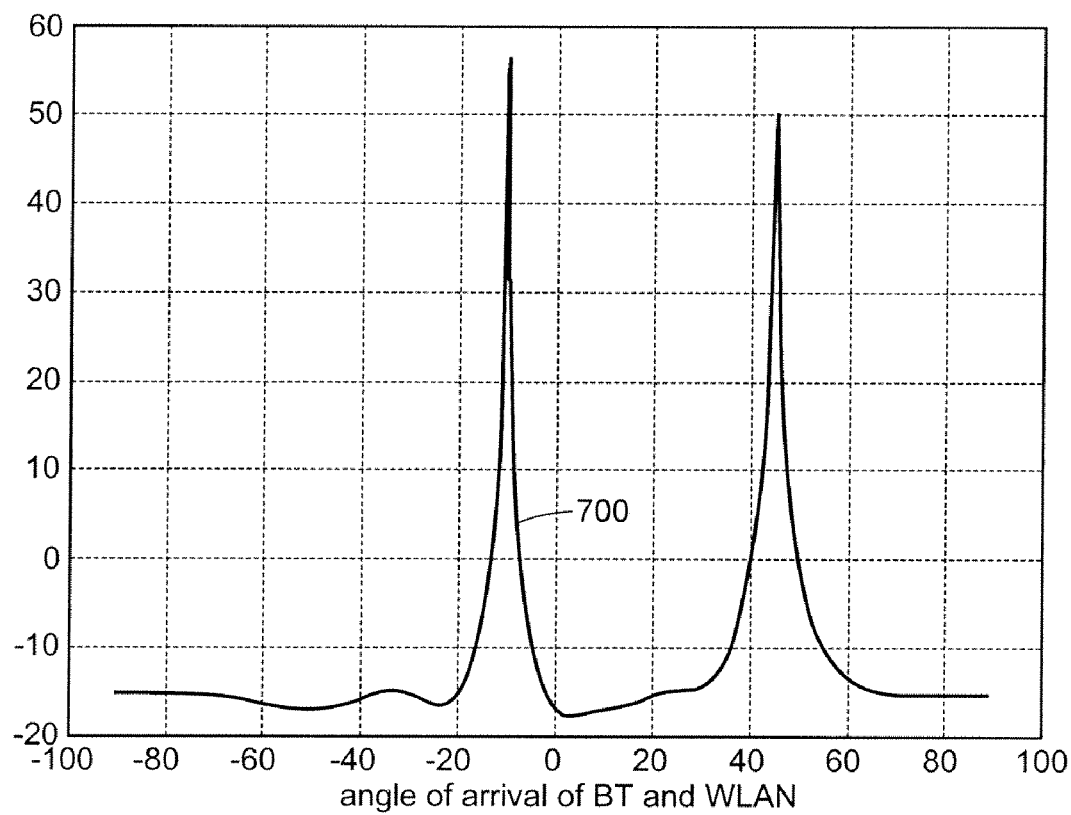
FIG. 7 is a plot of an angle of arrival estimation for the dual network device of FIG. 1.

FIG. 7 is a plot 700 of the angle of arrival estimation for a signal S(t) formed of two components, one from a Bluetooth remote device at approximately –10° from the null of an antenna array on a dual network device, the other from a WLAN device at approximately 45° from that null. The plot shows the results from an angle of arrival estimation performed using a MUSIC algorithm based on signal S(t) using techniques discussed hereinabove. As shown by the peaks and narrow linewidths on the corresponding estimated angles of arrival, the MUSIC algorithm was able to identify the constituent angle of arrivals with high accuracy.

Figure 8:
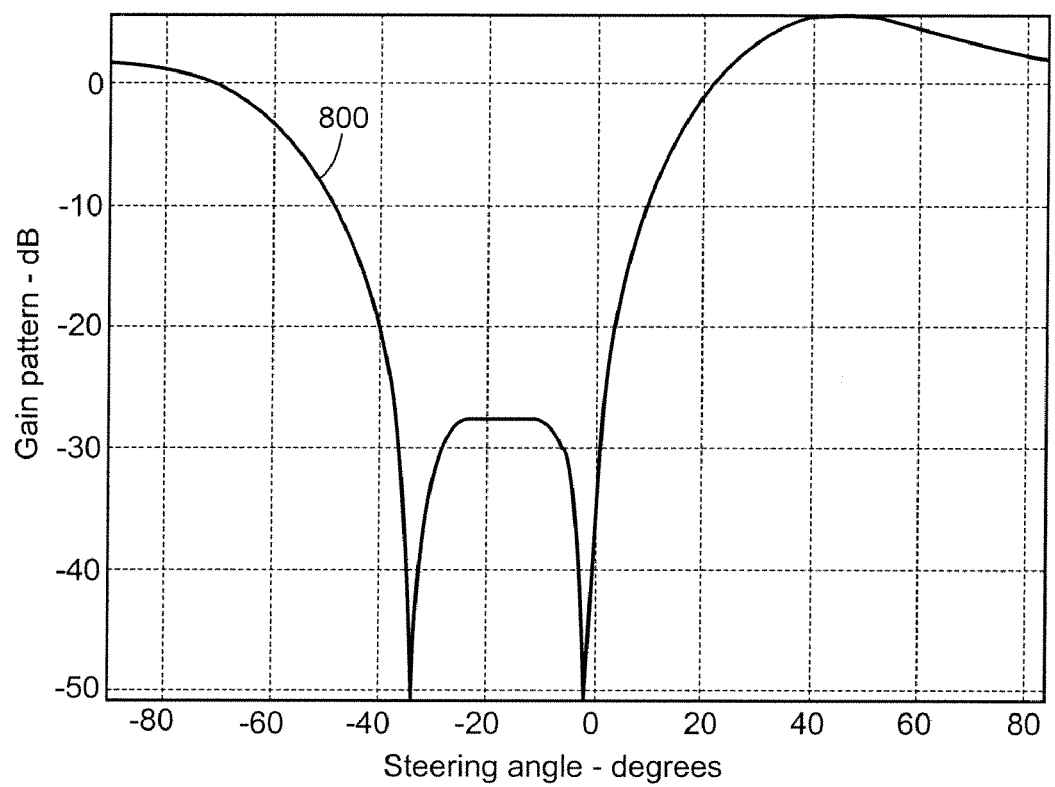
FIG. 8 is a plot of a receiver beam pattern for a WLAN communication path for the dual network device of FIG. 1.

FIG. 8 is a plot 800 of a beam pattern created by a primary, dual wireless device for transmitting and receiving WLAN data between that device and a WLAN device. The plot 800 shows that with properly determined phase correction coefficients adjusting the phase for the dual antenna array, the WLAN signal may be maximized along WLAN angles of arrival, e.g., 45°, and minimized along Bluetooth angles of arrival, e.g., –10°. In the illustrated example, an isolation of approximately 33 dB (signal intensity comparison) between the two angles of directions has been achieved.

Figure 9:
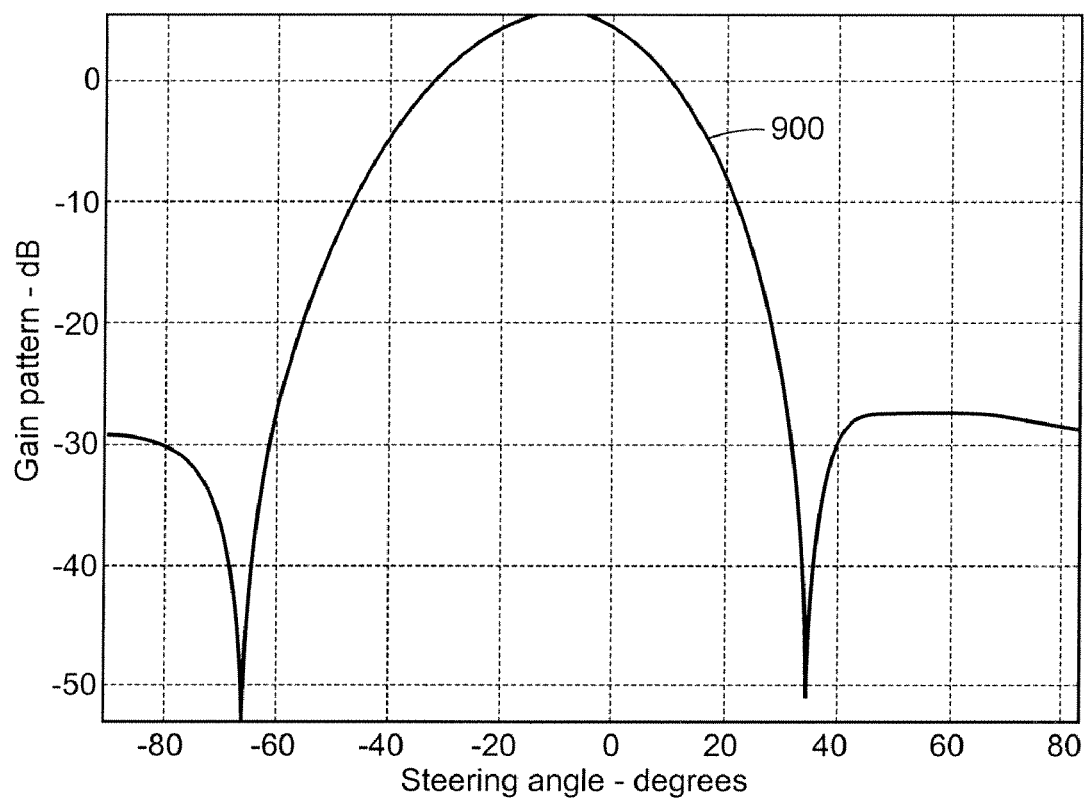
FIG. 9 is a plot of a receiver beam pattern for a Bluetooth communication path for the dual network device of FIG. 1.

FIG. 9 is a plot 900 of a beamforming pattern that has been created for transmitting and receiving Bluetooth data between a primary, dual wireless device and a Bluetooth device. The plot 900 shows that with properly determined phase correction coefficients adjusting the phase for the dual antenna array, the Bluetooth signal may be maximized along Bluetooth angles of arrival, e.g., –10°, and minimized along WLAN angles of arrival, e.g., 45°. In the illustrated example, an isolation of approximately 33 dB between the two angles of directions has been achieved.

The plot of FIGS. 8 and 9 are provided by way of example. The isolation intensity values are merely representative. The side lobes in the undesired directions may be suppressed by any desired achievable amount. Furthermore, various techniques and antenna array types will be known for achieving nearly complete suppression of undesired data signals in particular directions, to avoid interference.

Figure 10:
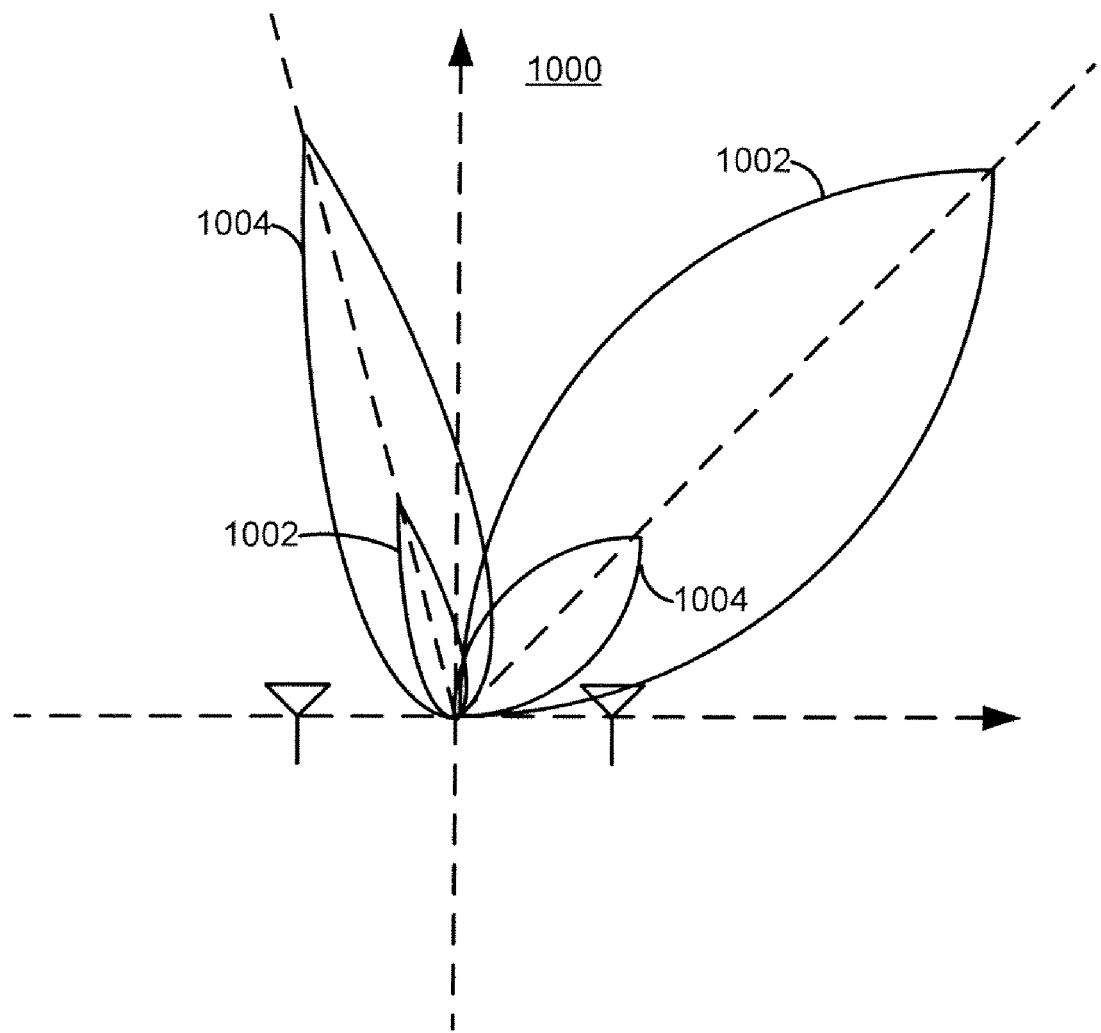
FIG. 10 is a plot similar to that of FIG. 2, but showing the beam patterns FIGS. 8 and 9.

FIG. 10 shows a plot 1000 similar to that of FIG. 2, but showing optimized beam patterns 1002 and 1004 corresponding to the dual wireless device Bluetooth communication path (FIG. 8) and WLAN communication path (FIG. 9), respectively and showing the reduced side lobes for the plotted examples.

These optimum beamforming techniques may be performed periodically by the signal processing and/or control circuit of a dual network device polls. Periodic updating will allow the signal processing and/or control circuit to analyze the angle of arrival of a communication signal even after the an initial optimization has occurred, thereby allowing the device to adjust the optimum angle of arrival and resulting beam pattern as the dual network device moves relative to the remote devices. This periodic updating may be particularly useful in maintaining a non-interfering beam pattern for the transmission of data to remote WLAN devices, because often a primary network device will move relative to a WLAN device while not relative to a Bluetooth headset.

In some examples, the phase correction coefficients may be determined and stored for different types of devices. For example, different Bluetooth remote devices may have different predetermined angles of arrival. When the dual wireless device detects the presence of a particular Bluetooth remote device, the wireless device may access a look up table to determine if an existing optimum beamforming angle or arrival has already been determined for the Bluetooth device.

Further still, signal processing and/or control circuits may be designed to determine a new, optimum beamforming pattern if a potentially interfering communication path has been terminated. For example, the optimum beamforming pattern for a Bluetooth headset as determined during a dual operation mode in which a device is also communicating WLAN data may be modified if the WLAN connection is lost or terminated. In the event the MUSIC algorithm determines the angle of arrival solely from the Bluetooth signal, for example, the signal processing and/or control circuit may expand the beam pattern for Bluetooth data to a larger coverage area or may increase signal intensity for the Bluetooth data, i.e., until a new WLAN remote device is identified.

It will be appreciated that various examples above are discussed in terms of optimizing beamforming on Bluetooth and WLAN channels to avoid interference between the two. The techniques described herein may be used to prevent or minimize interference between any two types of communication protocols. Furthermore, while dual network devices have been described, the wireless devices may be compatible with any number of communication protocols, and have two or higher element antenna arrays for controlling beamforming. In some examples, smart antenna arrays may be used in place of the dual element antenna arrays and may be programmed directly by the signal processing and/or control circuits of the wireless devices.

Figure 11A:
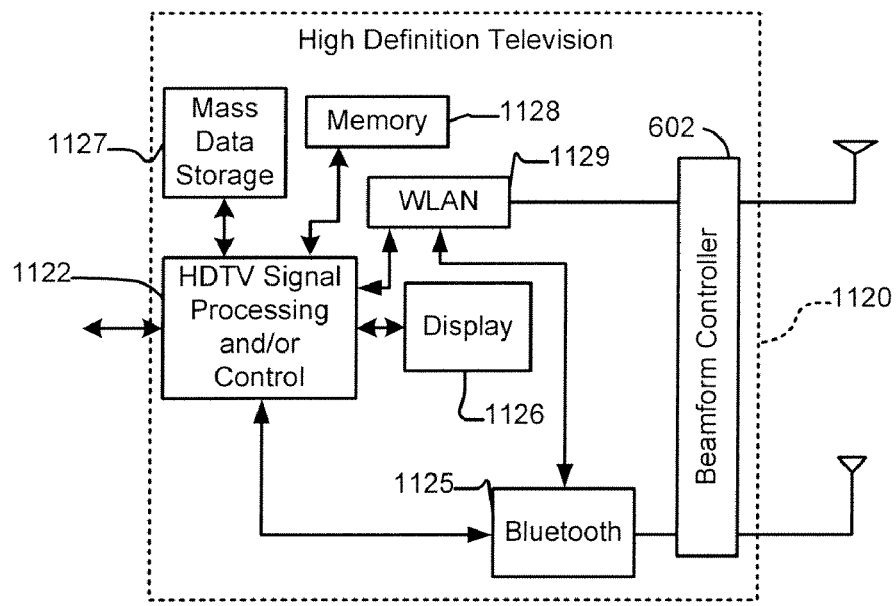
FIGS. 11A-11E illustrate embodiments of circuits that may incorporate a beamform controller and angle of arrival estimator for reducing interference in simultaneous operating network protocols.

Techniques using a power management mode of a WLAN for interference avoidance between Bluetooth transmissions and WLAN transmissions may be utilized in a variety of devices that have both WLAN and Bluetooth capabilities. Referring now to FIGS. 11A-11E, various example devices are shown that may utilize such techniques. Referring to FIG. 11A, such techniques may be utilized in a high definition television (HDTV) 1120. The HDTV 1120 includes signal processing and/or control circuits, which are generally identified in FIG. 11A at 1122, a WLAN interface 1129, and a mass data storage 1127. Bluetooth suppression techniques may be utilized in the WLAN interface 1129 or the signal processing circuit and/or control circuit 1122, for example. HDTV 1120 receives HDTV input signals in either a wired or wireless format and generates HDTV output signals for a display 1126. In some implementations, signal processing circuit and/or control circuit 1122 and/or other circuits (not shown) of HDTV 1120 may process data, perform coding and/or encryption, perform calculations, format data and/or perform any other type of HDTV processing that may be required.

HDTV 1120 may communicate with mass data storage 1127 that stores data in a nonvolatile manner such as optical and/or magnetic storage devices. The mass data storage 1127 may include one or more hard disk drives (HDDs) and/or one or more digital versatile disks (DVDs). One or more of the HDDs may be a mini HDD that includes one or more platters having a diameter that is smaller than approximately 1.8". HDTV 1120 may be connected to memory 1128 such as RAM, ROM, low-latency nonvolatile memory such as flash memory and/or other suitable electronic data storage. HDTV 1120 also may support wireless connections with a WLAN via a WLAN network interface 1129. HDTV 1120 also may support wireless connections with Bluetooth enabled devices via a Bluetooth interface 1125. The WLAN network interface 1129 may include, or be coupled to, a WLAN control block (not shown). The Bluetooth interface 1125 may include, or be coupled to, a Bluetooth control block (not shown). In accordance with examples discussed above, a beamform controller 1102 optimizes the beam patterns for different protocol data types to be communicated via an antenna array, which may allow the device 1120 to simultaneously communicate Bluetooth and WLAN data.

Figure 11B:
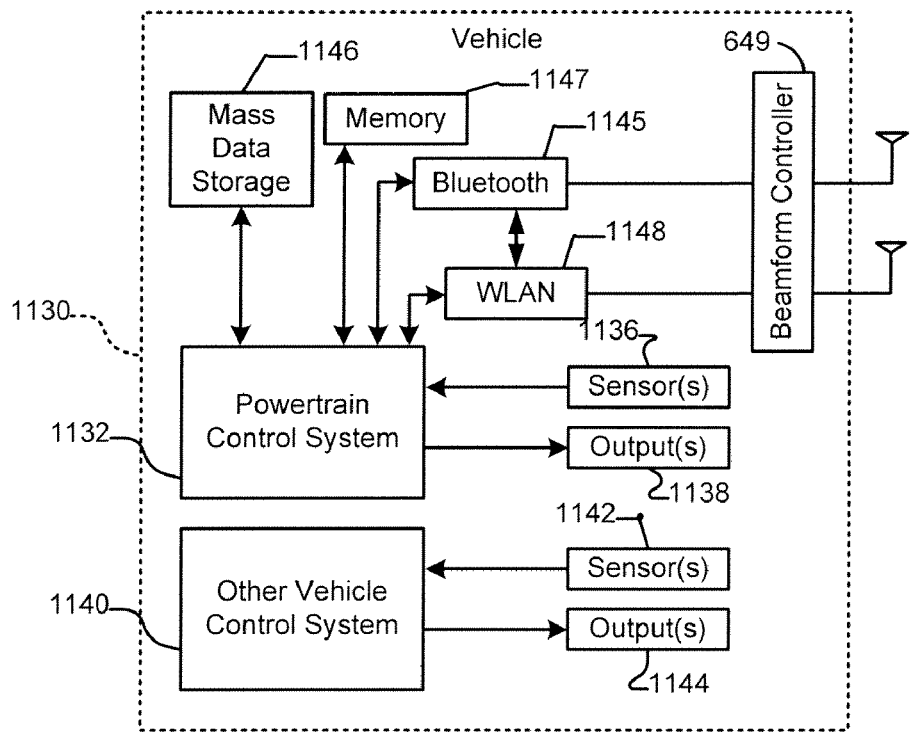

Referring now to FIG. 11B, techniques such as described above may be utilized in a control system of a vehicle 1130. In some implementations, a powertrain control system 1132 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

A control system 1140 may likewise receive signals from input sensors 1142 and/or output control signals to one or more output devices 1144. In some implementations, control system 1140 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1132 may communicate with mass data storage 1146 that stores data in a nonvolatile manner. Mass data storage 1146 may include optical and/or magnetic storage devices for example hard disk drives HDD and/or DVDs. One or more of the HDDs may be a mini HDD that includes one or more platters having a diameter that is smaller than approximately 1.8". Powertrain control system 1132 may be connected to memory 1147 such as RAM, ROM, low-latency nonvolatile memory such as flash memory and/or other suitable electronic data storage. Powertrain control system 1132 and/or control system 1140 also may support wireless connections with a WLAN via a WLAN network interface 1148. Powertrain control system 1132 and/or control system 1140 also may support wireless connections to Bluetooth enabled devices via a Bluetooth interface 1145. The WLAN network interface 1148 may include, or be coupled to, a WLAN control block (not shown). The Bluetooth interface 1145 may include, or be coupled to, a Bluetooth control block (not shown). In accordance with examples discussed above, a beamform controller 1149 optimizes the beam patterns for different protocol data types to be communicated via an antenna array, which may allow the device 1130 to simultaneously communicate Bluetooth and WLAN data.

Figure 11C:
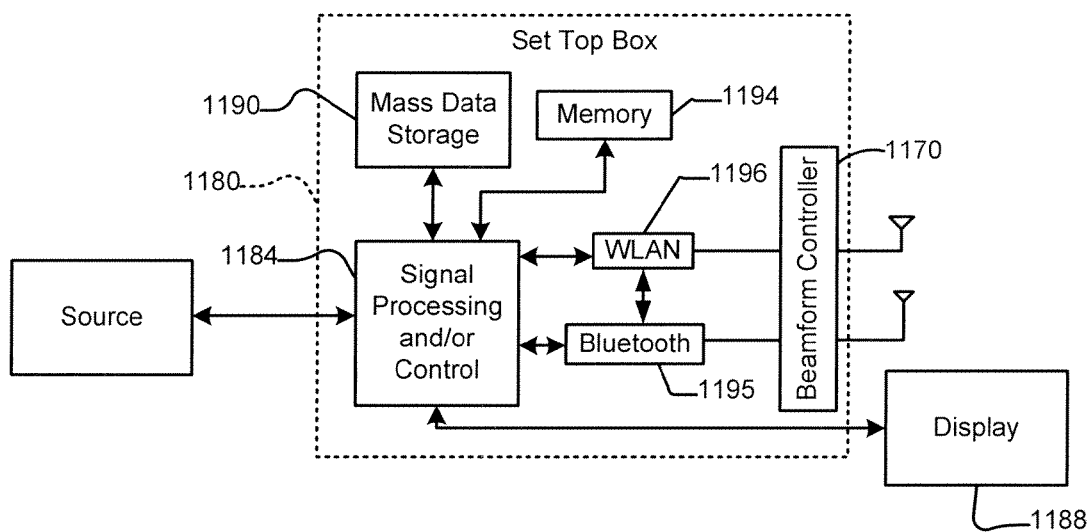

Referring now to FIG. 11C, techniques such as described above may be utilized in a set top box 1180. The set top box 1180 includes signal processing and/or control circuits, which are generally identified in FIG. 11C at 1184, and a mass data storage device 1190. Set top box 1180 receives signals from a Source such as a broadband source and outputs standard and/or high-definition audio/video signals suitable for a display 1188 such as a television and/or monitor and/or other video and/or audio output devices. Signal processing and/or control circuits 1184 and/or other circuits (not shown) of the set top box 1180 may process data, perform coding and/or encryption, perform calculations, format data and/or perform any other set top box function.

Set top box 1180 may communicate with mass data storage 1190 that stores data in a nonvolatile manner. Mass data storage 1190 may include optical and/or magnetic storage devices for example hard disk drives HDD and/or DVDs. At least one HDD may be a mini HDD that includes one or more platters having a diameter that is smaller than approximately 1.8". Set top box 1180 may be connected to memory 1194 such as RAM, ROM, low-latency nonvolatile memory such as flash memory and/or other suitable electronic data storage. Set top box 1180 also may support wireless connections with a WLAN via the WLAN network interface 1196. Set top box 1180 also may support wireless connections to Bluetooth enabled devices via a Bluetooth interface 1195. The WLAN network interface 1196 may include, or be coupled to, a WLAN control block (not shown). The Bluetooth interface 1195 may include, or be coupled to, a Bluetooth control block (not shown). The WLAN control block and the Bluetooth control block may be coupled together. Optionally, the WLAN control block and/or the Bluetooth control block may be included in signal processing/control block 1184. In accordance with examples discussed above, a beamform controller 1170 optimizes the beam patterns for different protocol data types to be communicated via an antenna array, which may allow the device 1150 to simultaneously communicate Bluetooth and WLAN data.

Figure 11D:
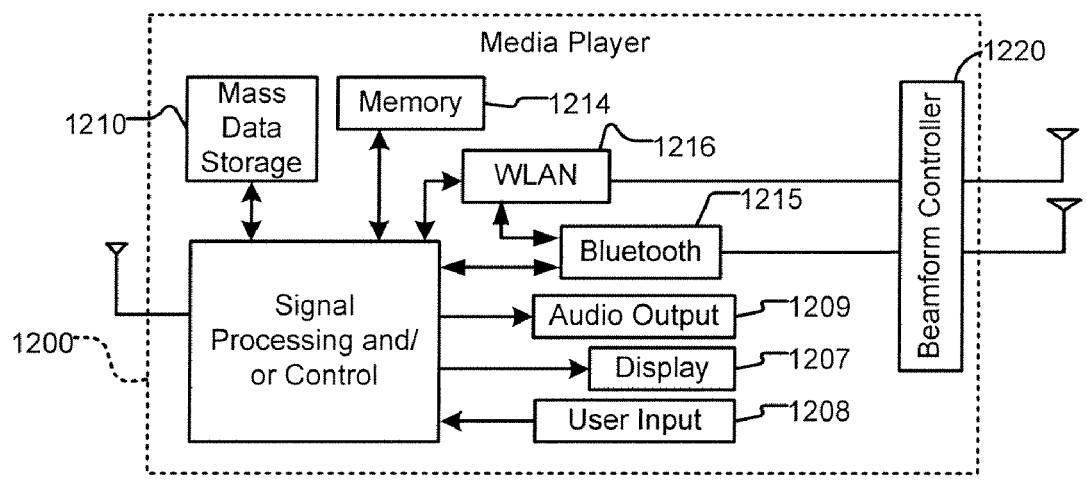

Referring now to FIG. 11D, techniques such as described above may be utilized in a media player 1200. The media player 1200 may include signal processing and/or control circuits, which are generally identified in FIG. 11D at 1204, and a mass data storage device 1210. In some implementations, media player 1200 includes a display 1207 and/or a user input 1208 such as a keypad, touchpad and the like. In some implementations, media player 1200 may employ a graphical user interface (GUI) that typically employs menus, drop down menus, icons and/or a point-and-click interface via display 1207 and/or user input 1208. Media player 1200 further includes an audio output 1209 such as a speaker and/or audio output jack. Signal processing and/or control circuits 1204 and/or other circuits (not shown) of media player 1200 may process data, perform coding and/or encryption, perform calculations, format data and/or perform any other media player function.

Media player 1200 may communicate with mass data storage 1210 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may be a mini HDD that includes one or more platters having a diameter that is smaller than approximately 1.8". Media player 1200 may be connected to memory 1214 such as RAM, ROM, low-latency nonvolatile memory such as flash memory and/or other suitable electronic data storage. Media player 1200 also may support wireless connections with a WLAN via a WLAN network interface 1216. Media player 1200 also may support wireless connections to Bluetooth enabled devices via a Bluetooth interface 1215. The WLAN network interface 1216 may include, or be coupled to, a WLAN control block (not shown). The Bluetooth interface 1215 may include, or be coupled to, a Bluetooth control block (not shown). The WLAN control block and the Bluetooth control block may be coupled together. Optionally, the WLAN control block and/or the Bluetooth control block may be included in signal processing/control block 1204. In accordance with examples discussed above, a beamform controller 1220 optimizes the beam patterns for different protocol data types to be communicated via an antenna array, which may allow the device 1200 to simultaneously communicate Bluetooth and WLAN data.

Figure 11E:
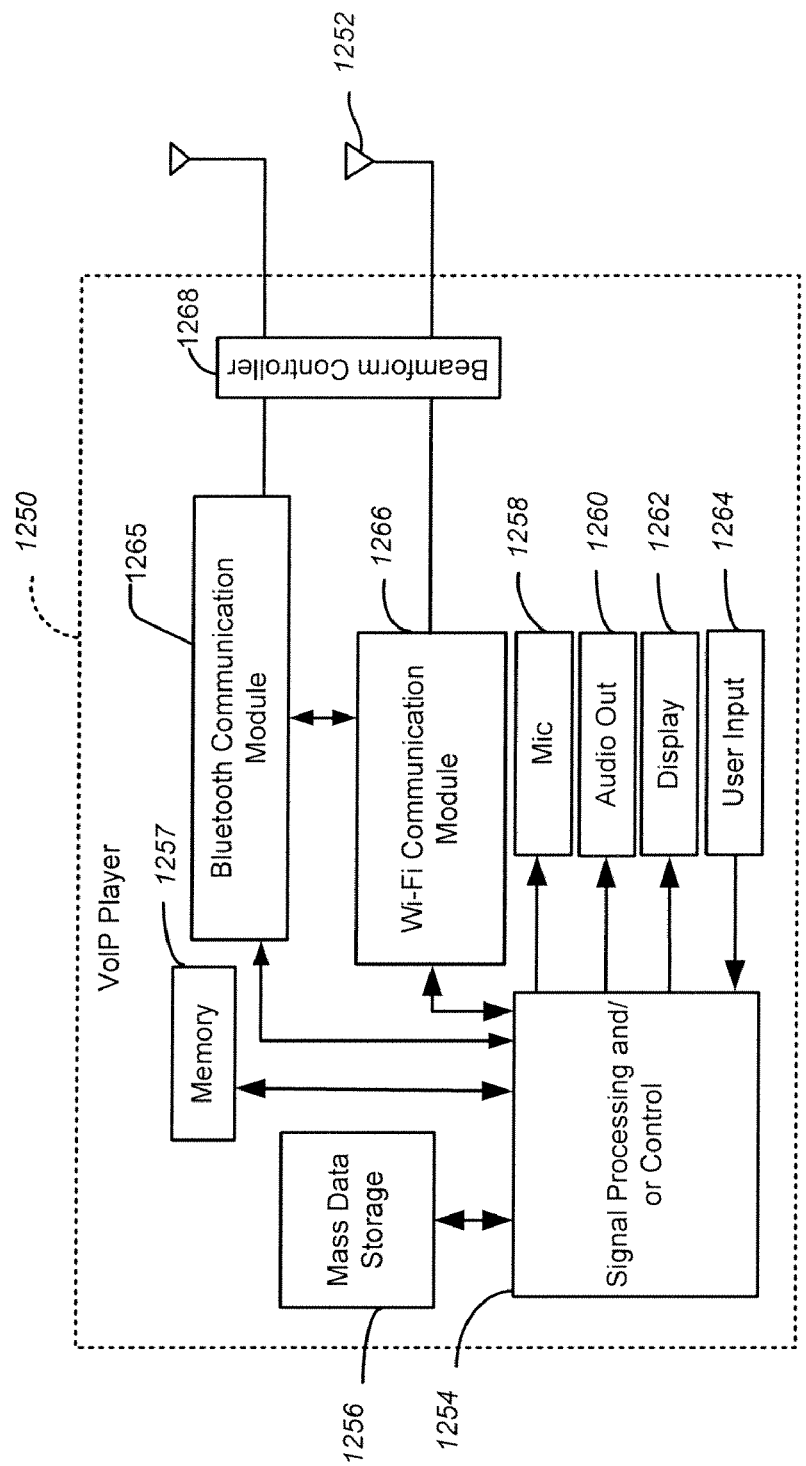

Referring to FIG. 11E, techniques such as described above may be utilized in a Voice over Internet Protocol (VoIP) phone 1250 that may include an antenna 1252, signal processing and/or control circuits 1254, and a mass data storage 1256. In some implementations, VoIP phone 1250 includes, in part, a microphone 1258, an audio output 1260 such as a speaker and/or audio output jack, a display monitor 1262, an input device 1264 such as a keypad, pointing device, voice actuation and/or other input devices, and a WLAN interface 1266. Signal processing and/or control circuits 1254 and/or other circuits (not shown) in VoIP phone 1250 may process data, perform coding and/or encryption, perform calculations, format data and/or perform other VoIP phone functions.

VoIP phone 1250 may communicate with mass data storage 1256 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 1250 may be connected to memory 1257, which may be a RAM, ROM, low-latency nonvolatile memory such as flash memory and/or other suitable electronic data storage. VoIP phone 1250 is configured to establish communications link with a VoIP network (not shown) via WLAN interface 1266. VoIP phone 1250 also may support wireless connections to Bluetooth enabled devices via a Bluetooth interface 1265. The WLAN network interface 1266 may include, or be coupled to, a WLAN control block (not shown). The Bluetooth interface 1265 may include, or be coupled to, a Bluetooth control block (not shown). The WLAN control block and the Bluetooth control block may be coupled together. Optionally, the WLAN control block and/or the Bluetooth control block may be included in signal processing/control block 1254. In accordance with examples discussed above, a beamform controller 1268 optimizes the beam patterns for different protocol data types to be communicated via an antenna array, which may allow the device 1250 to simultaneously communicate Bluetooth and WLAN data.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for a primary network device to communicate with a first remote wireless device and a second remote wireless device, the first network device having an antenna array, the method comprising:
   identifying a first communication path for transmitting Bluetooth data between the primary network device and the first remote wireless device, including determining a first angle of arrival of a first signal communicated from the first remote wireless device to the primary network device along the first communication path;

identifying a second communication path for transmitting wireless local area network (WLAN) data between the primary network device and the second remote wireless device, including determining a second angle of arrival of a second signal communicated from the second remote wireless device to the primary network device along the second communication path, wherein the first angle of arrival of the first signal communicated from the first remote wireless device is different than the second angle of arrival of the second signal communicated from the second remote wireless device;

determining a first beam pattern for the antenna array for communicating the Bluetooth data along the first communication path, wherein the first beam pattern is to communicate, at a primary Bluetooth signal strength, the Bluetooth data in a direction corresponding to the first angle of arrival while minimizing any communication of the Bluetooth data at a suppressed Bluetooth signal strength in a direction corresponding to the second angle of arrival, wherein the suppressed Bluetooth signal strength is lower than the primary Bluetooth signal strength; and determining a second beam pattern for the antenna array for communicating WLAN data along the second communication path, wherein the second beam pattern is to communicate, at a primary WLAN signal strength, the WLAN data in the direction corresponding to the second angle of arrival while minimizing any communication of the WLAN data at a suppressed WLAN signal strength in the direction corresponding to the first angle of arrival, wherein the suppressed WLAN signal strength is lower than the primary WLAN signal strength.

2. The method of claim 1, further comprising determining an optimal difference angle between the first angle of arrival and the second angle of arrival.

3. The method of claim 1, wherein identifying the first communication path comprises:
receiving the first signal at the primary network device;
downconverting the first signal to a baseband signal;
determining in-phase and quadrature-phase components of the baseband signal; and
performing a multiple signal classification (MUSIC) algorithm on the in-phase and quadrature-phase components to determine phase correction coefficients for the antenna array.

4. The method of claim 1, wherein determining the first beam pattern for the antenna array comprises determining a first set of phase correction coefficients, and wherein determining the second beam pattern for the antenna array comprises determining a second set of phase correction coefficients.

5. The method of claim 4, further comprising:
applying the first set of phase correction coefficients to the antenna array to transmit the Bluetooth data in the first beam pattern; and
applying the second set of phase correction coefficients to the antenna array to transmit the WLAN data in the second beam pattern.

6. The method of claim 1, wherein the first beam pattern for communicating the Bluetooth data has a signal strength ratio of 30 dB or more between the primary Bluetooth signal strength in the direction corresponding to the first angle of arrival and the suppressed Bluetooth signal strength in the direction corresponding to the second angle of arrival.

7. The method of claim 6, wherein the second beam pattern for communicating the WLAN data has a signal strength ratio of 30 dB or more between the WLAN signal strength in the direction corresponding to the second angle of arrival and the suppressed WLAN signal strength in the direction corresponding to the first angle of arrival.

8. The method of claim 1, further comprising simultaneously communicating the Bluetooth data along the first communication path and the WLAN data along the second communication path.

9. The method of claim 1, further comprising simultaneously receiving (1) the Bluetooth data at a Bluetooth interface of the primary wireless device and transmitted along the first communication path and (2) the WLAN data at a WLAN interface of the primary wireless device and transmitted along the second communication path.

10. The method of claim 1, further comprising periodically updating the first beam pattern and the second beam pattern.

11. An apparatus for controlling beamforming of an antenna array for a network device, the apparatus comprising:
a Bluetooth interface to receive Bluetooth data;
a wireless local area network (WLAN) interface to receive WLAN data; and
a beamform controller to
control the antenna array to transmit and receive the Bluetooth data along a first communication path occurring at a first beam pattern angle of arrival, and
control the antenna array to transmit and receive the WLAN data along a second communication path occurring at a second beam pattern angle of arrival different than the first beam pattern angle of arrival,
wherein the beamform controller is capable of transmitting or receiving the Bluetooth data while simultaneously transmitting or receiving the WLAN data and such that the Bluetooth data is transmitted on a first beam pattern having a primarily Bluetooth signal strength along the first beam pattern angle and a suppressed Bluetooth signal strength along the second beam pattern angle to minimize interference along the second communication path and such that the WLAN data is transmitted on a second beam pattern having a primary WLAN signal strength along the second beam pattern angle and a suppressed WLAN signal strength along the first beam pattern angle to minimize interference along the first communication path.

12. The apparatus of claim 11, wherein the beamform controller comprises for each respective antenna of the antenna array (1) an in-phase and a quadrature-phase converter stage to produce an in-phase signal and quadrature-phase signal of a radio frequency (RF) signal received at the respective antenna and (2) a multiplier stage to multiply the in-phase signal and the quadrature-phase signal by a weighting coefficient.

13. The apparatus of claim 12, wherein the beamform controller further comprises a summer coupled to each multiplier stage to add weighted in-phase and quadrature-phase signals from each of respective antenna together to form a weighted RF signal.

14. The apparatus of claim 13, further comprising:
a processor to receive the weighted RF signal, to determine at least one angle of arrival for the weighted RF signal, and to determine phase correction coefficients for the antenna array, wherein by applying different phase correction coefficients to the antenna array the apparatus is capable of selectively transmitting the Bluetooth data along the first communication path and the WLAN data along the second communication path.

15. The apparatus of claim 14, wherein the processor is to apply a multiple signal classification (MUSIC) algorithm on the weighted RF signal to determine the at least one angle of arrival.

16. The apparatus of claim 14, wherein the weighted RF signal comprises signals from a plurality of remote devices, and wherein the processor is to apply a multiple signal classification (MUSIC) algorithm on the weighted RF signal to determine an angle of arrival for each of the plurality of remote devices.

17. The apparatus of claim 14, wherein the processor is to periodically update the determination of the at least one angle of arrival to reflect a change in the at least one angle of arrival.

18. A method for forming beam patterns for a wireless device having an antenna array, the method comprising:
   determining a first communication path between the wireless device and a first remote device, the first communication path having a first beam pattern directed at a first angle, the first communication path for communicating first data that is compliant with a first wireless communication protocol; and
   determining a second communication path between the wireless device and a second remote device, the second communication path having a second beam pattern directed at a second angle, the second communication path for communicating second data that is compliant with a second wireless communication protocol;
   wherein the first beam pattern is formed such that the first data is transmitted on the first beam pattern having a primarily signal strength along the first angle and a suppressed signal strength along the second angle to minimize interference along the second communication path, and
   wherein the second beam pattern is formed such that the second data is transmitted on the second beam pattern having a primary signal strength along the second angle and a suppressed signal strength along the first angle to minimize interference along the first communication path.

19. The method of claim 18, wherein the first wireless communication protocol is a Bluetooth protocol and the second wireless communication protocol is one of a plurality of Wireless Fidelity protocols.

20. The method of claim 18, wherein the first remote device is a Bluetooth-enabled device and wherein the second remote device is a wireless access point.

21. The method of claim 18, wherein the Bluetooth-enabled device includes a headset.

22. The method of claim 18, wherein determining the first communication path comprises determining the first angle of the first data, and wherein determining the second communication path comprises determining the second angle of the second data.

23. The method of claim 22, further comprising determining an optimal difference angle between the first angle and the second angle.

24. The method of claim 22, wherein determining the first communication path and determining the second communication path comprise:
   receiving an RF signal at the wireless device;
   downconverting the received RF signal to a baseband signal;
   determining in-phase and quadrature-phase components of the baseband signal; and
   performing a multiple signal classification (MUSIC) algorithm on the in-phase and quadrature-phase components to determine phase correction coefficients for the antenna array.

25. The method of claim 18, wherein determining the first communication path having the first beam pattern comprises determining a first set of phase correction coefficients, and wherein determining the second communication path having the second beam pattern comprises determining a second set of phase correction coefficients.

26. The method of claim 25, further comprising:
   applying the first set of phase correction coefficients to the antenna array to transmit the first data in the first beam pattern; and
   applying the second set of phase correction coefficients to the antenna array to transmit the second data in the second beam pattern.

27. The method of claim 18, wherein the first beam pattern for communicating the first data has a signal strength ratio of 30 dB or more between the primary signal strength of the first data along the first communication path and the suppressed signal strength of the first data along the second communication path.

28. The method of claim 27, wherein the second beam pattern for communicating the second data has a signal strength ratio of 30 dB or more between the primary signal strength of the second data along the second communication path and the suppressed signal strength of the second data along the first communication path.

29. The method of claim 18, further comprising simultaneously communicating the first data along the first communication path and the second data along the second communication path.

30. The method of claim 18, further comprising simultaneously receiving (1) the first data at a first protocol interface of the wireless device and transmitted along the first communication path and (2) the second data at a second protocol interface of the wireless device and transmitted along the second communication path.

31. The method of claim 18, further comprising periodically updating the first communication path and the second communication path.

32. An apparatus for forming beam patterns for a wireless device having an antenna array, the apparatus comprising:
   a first protocol interface to receive and transmit first data that is compliant with a first wireless communication protocol;
   a second protocol interface to receive and transmit second data that that is compliant with a second wireless communication protocol; and
   a beamform controller to
      determine a first communication path between the wireless device and a first remote device, the first communication path having a first beam pattern directed at a first angle and that is used for communicating the first data, and
      determine a second communication path between the wireless device and a second remote device, the second communication path having a second beam pattern directed at a second angle and that is used for communicating the second data;
   wherein the first beam pattern is formed such that the first data is received and transmitted on the first beam pattern having a primarily signal strength along the first angle and a suppressed signal strength along the second angle to minimize interference along the second communication path, and wherein the second beam pattern is formed such that the second data is received and transmitted on the second beam pattern having a primary signal strength along the second angle and a suppressed signal strength along the first angle to minimize interference along the first communication path.

33. The apparatus of claim 32, wherein the first wireless communication protocol is a Bluetooth protocol and the second wireless communication protocol is one of a plurality of Wireless Fidelity protocols.

34. The apparatus of claim 32, wherein the beamform controller is to determine the first angle of the first communication path, and to determine the second angle of the second communication path.

35. The apparatus of claim 32, wherein the beamform controller is to determine a first set of phase correction coefficients corresponding to the first communication path, and to determine a second set of phase correction coefficients corresponding to the second communication path, wherein applying the first set of phase correction coefficients to the antenna array, the wireless device is able to transmit the first data in the first beam pattern, and wherein applying the second set of phase correction coefficients to the antenna array, the wireless device is able to transmit the second data in the second beam pattern.

36. The apparatus of claim 32, wherein the beamform controller comprises for each respective antenna of the antenna array (1) an in-phase and a quadrature-phase converter stage to produce an in-phase signal and quadrature-phase signal of a radio frequency (RF) signal received at the respective antenna and (2) a multiplier stage to multiply the in-phase signal and the quadrature-phase signal by a weighting coefficient.

37. The apparatus of claim 36, wherein the beamform controller further comprises a summer coupled to each multiplier stage to add weighted in-phase and quadrature-phase signals from each of respective antenna together to form a weighted RF signal.

38. The apparatus of claim 37, further comprising:

a processor to receive the weighted RF signal, to determine at least one angle of arrival for the weighted RF signal, and to determine phase correction coefficients for the antenna array, wherein by applying different phase correction coefficients to the antenna array the apparatus is capable of selectively transmitting the first data along the first communication path and the second data along the second communication path.

39. The apparatus of claim 38, wherein the processor is to apply a multiple signal classification (MUSIC) algorithm on the weighted RF signal to determine the at least one angle of arrival.

40. The apparatus of claim 38, wherein the weighted RF signal comprises signals from a plurality of remote devices, and wherein the processor is to apply a multiple signal classification (MUSIC) algorithm on the weighted RF signal to determine an angle of arrival for each of the plurality of remote devices.

41. The apparatus of claim 38, wherein the processor is to periodically update the determination of the at least one angle of arrival to reflect a change in the at least one angle of arrival.

* * * * *